United States Patent
Kadowaki

(10) Patent No.: US 12,542,172 B2
(45) Date of Patent: Feb. 3, 2026

(54) SEMICONDUCTOR MEMORY DEVICE FOR ELIMINATING THE IMPACT OF OFFSET VOLTAGE AND CONTROL METHOD THEREOF

(71) Applicant: Winbond Electronics Corp., Taichung (TW)

(72) Inventor: Takuya Kadowaki, Yokohama (JP)

(73) Assignee: WINBOND ELECTRONICS CORP., Taichung (TW)

( * ) Notice: Subject to any disclaimer, the term of this patent is extended or adjusted under 35 U.S.C. 154(b) by 165 days.

(21) Appl. No.: 18/406,518

(22) Filed: Jan. 8, 2024

(65) Prior Publication Data

US 2024/0339150 A1 Oct. 10, 2024

(30) Foreign Application Priority Data

Apr. 7, 2023 (JP) .................................. 2023-062462

(51) Int. Cl.
*G11C 7/06* (2006.01)
*G11C 11/4074* (2006.01)
*G11C 11/4091* (2006.01)

(52) U.S. Cl.
CPC ............ *G11C 11/4091* (2013.01); *G11C 7/06* (2013.01); *G11C 11/4074* (2013.01); *G11C 7/065* (2013.01); *G11C 2207/002* (2013.01)

(58) Field of Classification Search
CPC ... G11C 11/4091; G11C 11/4074; G11C 7/06; G11C 7/065; G11C 2207/002;
(Continued)

(56) References Cited

U.S. PATENT DOCUMENTS 6,115,319 A * 9/2000 Kinoshita ................ G11C 8/08
365/189.11
6,201,728 B1 * 3/2001 Narui ..................... H10B 12/30
365/230.06

(Continued)

FOREIGN PATENT DOCUMENTS

EP 3 114 688 B1 11/2019
JP 2019-500714 A 1/2019
(Continued)

OTHER PUBLICATIONS

Korean Office Action for Korean Application No. 10-2023-0067960, dated Jan. 16, 2025, with English translation.

*Primary Examiner* — Mushfique Siddique
(74) *Attorney, Agent, or Firm* — Birch, Stewart, Kolasch & Birch, LLP

(57) ABSTRACT

A semiconductor memory device is provided and includes at least one sense amplifier and a control unit. The at least one sense amplifier includes a pair of first transistors and a pair of second transistors. The control unit provides voltages that are adjusted based on characteristics of the pair of first transistors and the pair of second transistors of each sense amplifier of the at least one sense amplifier to the pair of first transistors and the pair of the second transistors of each sense amplifier of the at least one sense amplifier so that voltages of a pair of bit lines connected to each sense amplifier of the at least one sense amplifier are close to a specific target voltage during an offset elimination operation.

18 Claims, 12 Drawing Sheets

(58) Field of Classification Search
CPC ..... G11C 5/06; G11C 11/4093; G11C 7/1069; G11C 11/4096; G11C 7/1048; G11C 7/12
See application file for complete search history.

(56) References Cited

U.S. PATENT DOCUMENTS

| | | | |
|---|---|---|---|
| 9,202,531 B2 | 12/2015 | Seo | |
| 2007/0194381 A1* | 8/2007 | Chun | G11C 11/4074 257/362 |
| 2011/0292709 A1* | 12/2011 | Takayama | G11C 11/4091 365/72 |
| 2012/0134227 A1* | 5/2012 | Fujisawa | G11C 7/065 365/208 |
| 2014/0119099 A1* | 5/2014 | Clark | H10B 12/50 365/149 |
| 2017/0222845 A1 | 8/2017 | Zerbe et al. | |
| 2019/0096446 A1* | 3/2019 | Lee | G11C 7/062 |
| 2021/0313945 A1 | 10/2021 | Hong et al. | |
| 2022/0157351 A1* | 5/2022 | Lin | G11C 7/065 |

FOREIGN PATENT DOCUMENTS

| | | |
|---|---|---|
| KR | 10-2022-0133898 A | 10/2022 |
| TW | I753792 B | 1/2022 |
| WO | WO 2022/198856 A1 | 9/2022 |

* cited by examiner

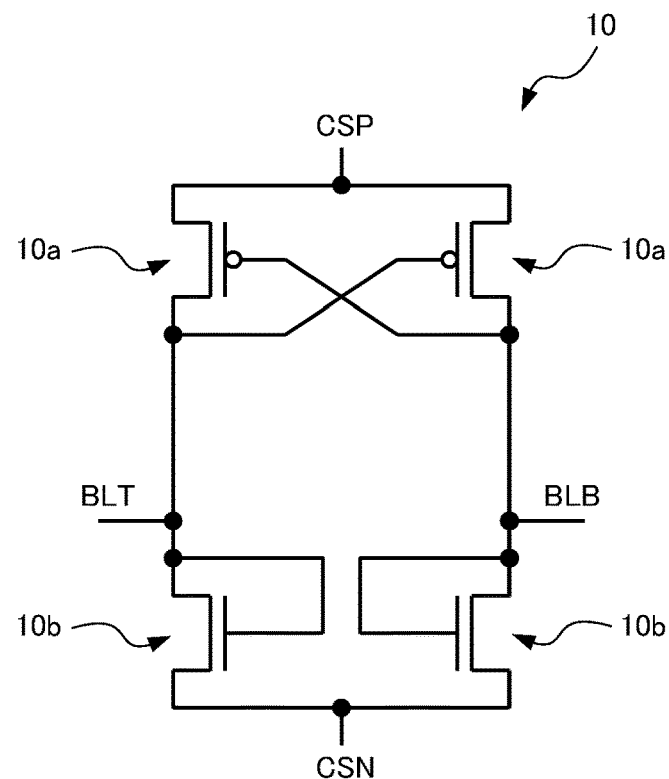
FIG. 2(A)
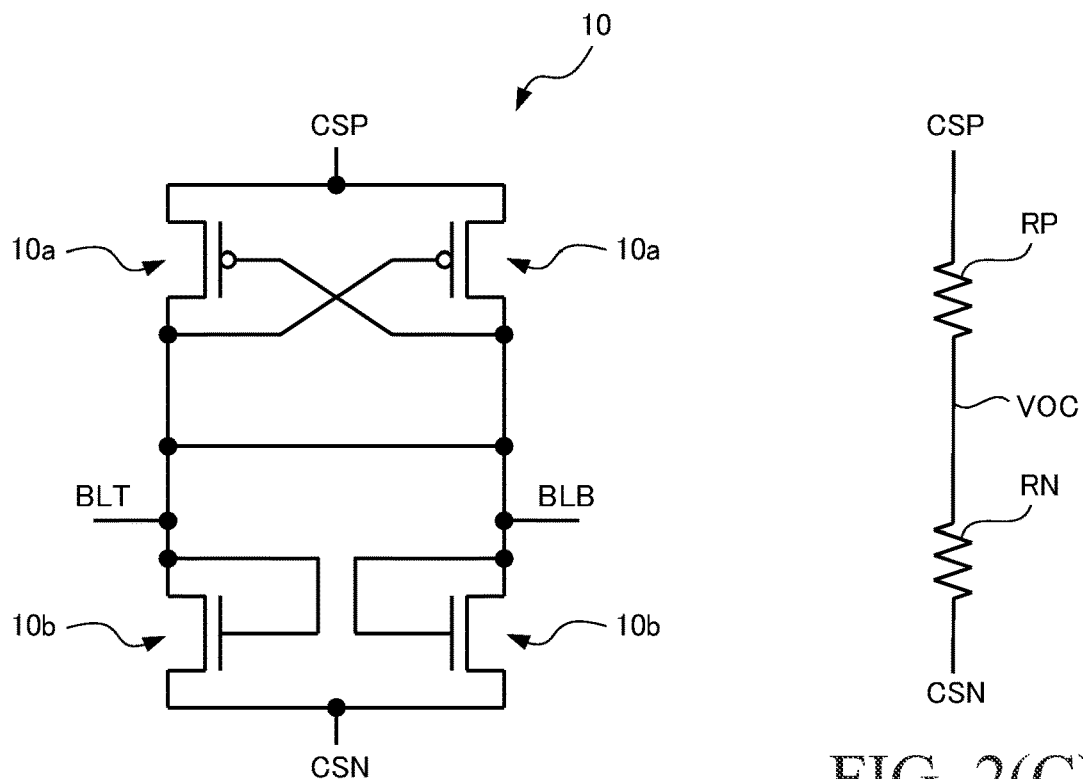
FIG. 2(B)
FIG. 2(C)

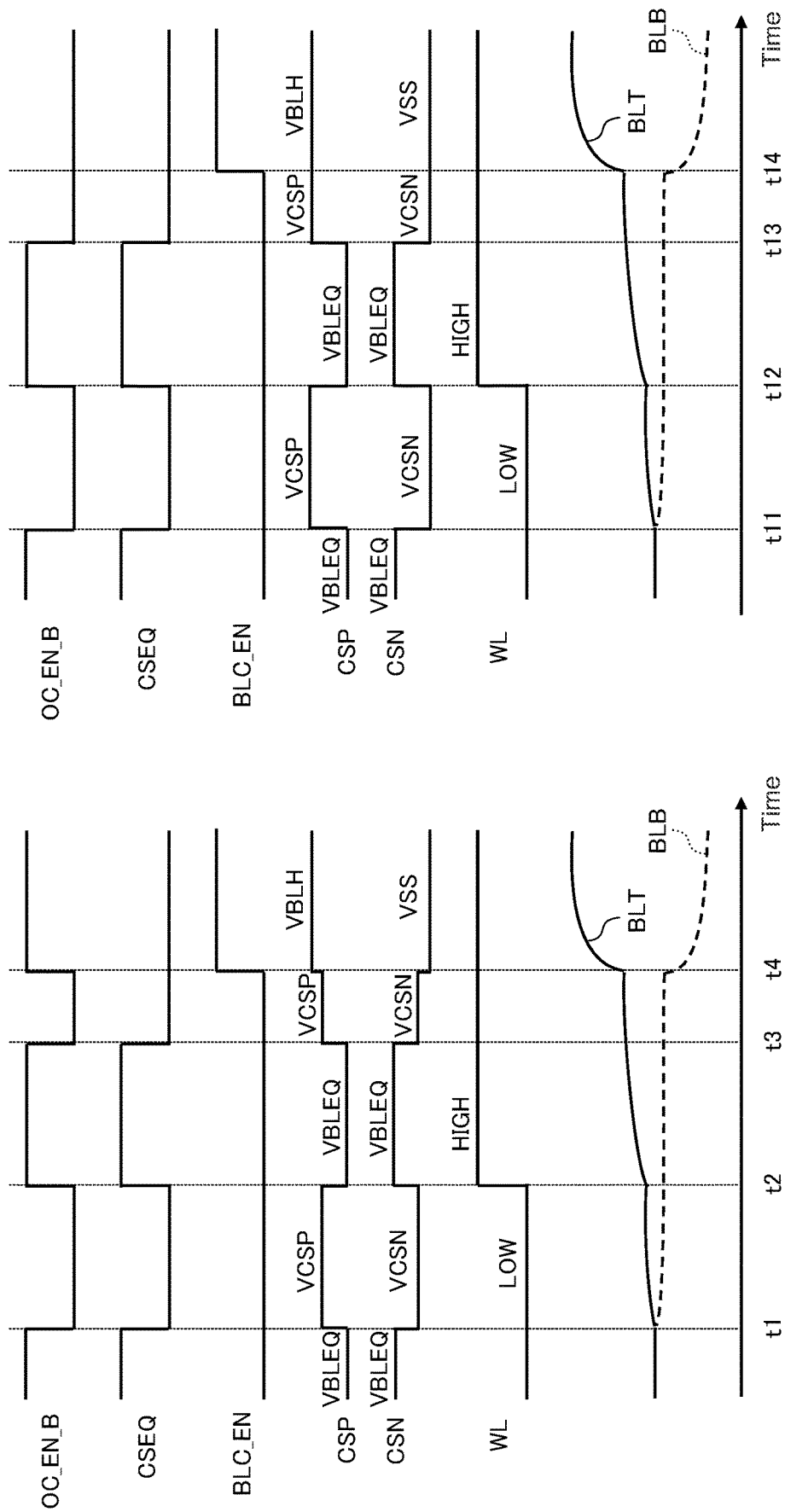

SEMICONDUCTOR MEMORY DEVICE FOR ELIMINATING THE IMPACT OF OFFSET VOLTAGE AND CONTROL METHOD THEREOF

CROSS REFERENCE TO RELATED APPLICATIONS

This application claims priority of Japan Patent Application 2023-062462, filed on Apr. 7, 2023, the entirety of which is incorporated by reference herein.

BACKGROUND OF THE INVENTION

Field of the Invention

The present invention relates to a semiconductor memory device and a control method thereof.

Description of the Related Art

A dynamic random access memory device generates a weak potential difference on a pair of bit lines, and data is read from the memory device through amplifying the potential difference by a sense amplifier. The sense amplifier comprises a pair of N-channel field-effect transistors (nMOSFETs) and a pair of P-channel field-effect transistors (pMOSFETs), which, however, induces an offset voltage due to the difference in characteristics of these transistors, thereby reducing a sense margin.

BRIEF SUMMARY OF THE INVENTION

When the voltages of the bit lines generated during an offset elimination operation is higher, the voltages of the sensed signals generated by the bit lines in a charge sharing operation after the offset elimination operation is less, which causes difficulty in detecting the sensed signals correctly. It is desirable that an effective resistance of a pair of nMOSFETs is equal to an effective resistance of a pair of pMOSFETs, thereby reducing the voltages on the bit lines generated during the offset elimination operation.

However, the effective resistances of a pair of nMOSFETs and a pair of pMOSFETs may vary due to variations in threshold voltage caused by differences in the process temperature stress (PVT) of the MOSFETs. In addition, the effective resistance of a pair of nMOSFETs and a pair of pMOSFETs of one of the sense amplifiers in the semiconductor memory device may be different from that of any one of the others of the sense amplifiers. Since the bit-line voltages generated during the offset elimination operation cannot be lowered, it is difficult to detect the sensed signals correctly, which is difficult to improve the sensing operation.

The present invention provides a semiconductor memory device. The semiconductor memory device comprises at least one sense amplifier and a control unit. The at least one sense amplifier comprises a pair of first transistors and a pair of second transistors. The control unit provides voltages that are adjusted based on characteristics of the pair of first transistors and the pair of second transistors of each sense amplifier of the at least one sense amplifier to the pair of first transistors and the pair of the second transistors of each sense amplifier of the at least one sense amplifier so that voltages of a pair of bit lines connected to each sense amplifier of the at least one sense amplifier are close to a specific target voltage during an offset elimination operation.

Even if the effective resistance values of the pair of first transistors and the pair of second transistors in one of the sense amplifiers are different and also different from those in any one of the others of the sense amplifiers due to difference in the characteristics of the pair of first transistors and the pair of second transistors, the voltages of a pair of bit lines are controlled to be close to the target voltage during the offset elimination operation. For example, the target is a voltage that is equal to a half of the voltage provided to the sense amplifier during the voltage amplification operation of the bit lines (that is, the voltage that is generated when the effective resistance value of the pair of first transistors is equal to the effective resistance value of the pair of second transistors). Therefore, the voltages of the pair of bit lines connected to each sense amplifier of the at least one sense amplifier can be controlled to be closed to the target voltage.

In addition, the present invention provides a control method for a semiconductor memory device. The semiconductor memory device comprises at least one sense amplifier. Each sense amplifier of the at least one sense amplifier comprises a pair of first transistors and a pair of second transistors. A control unit of the semiconductor memory device performs at least step: providing voltages that are adjusted based on characteristics of the pair of first transistors and the pair of second transistors of each sense amplifier of the at least one sense amplifier to the pair of first transistors and the pair of the second transistors of each sense amplifier of the at least one sense amplifier so that voltages of a pair of bit lines connected to each sense amplifier of the at least one sense amplifier are close to a specific target voltage during an offset elimination operation.

According to the semiconductor memory device and the control method thereof of the present invention, the sensing operation of the sense amplifier can be improved even when the characteristics of the transistors in one of the sense amplifiers are different and/or when the characteristics of the transistors in one of the sense amplifiers are different from those in any one of the others of the sense amplifiers.

BRIEF DESCRIPTION OF THE DRAWINGS

The present invention can be more fully understood by reading the subsequent detailed description and examples with references made to the accompanying drawings, wherein:

FIGS. 2(A) and 2(B) are schematic diagrams of a sense amplifier according to an embodiment;

FIG. 2(C) is an equivalent circuit diagram of FIG. 2(B);

FIGS. 8(A) and (B) show a timing diagram of an operation of a sense amplifier according to an embodiment of the present invention;

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
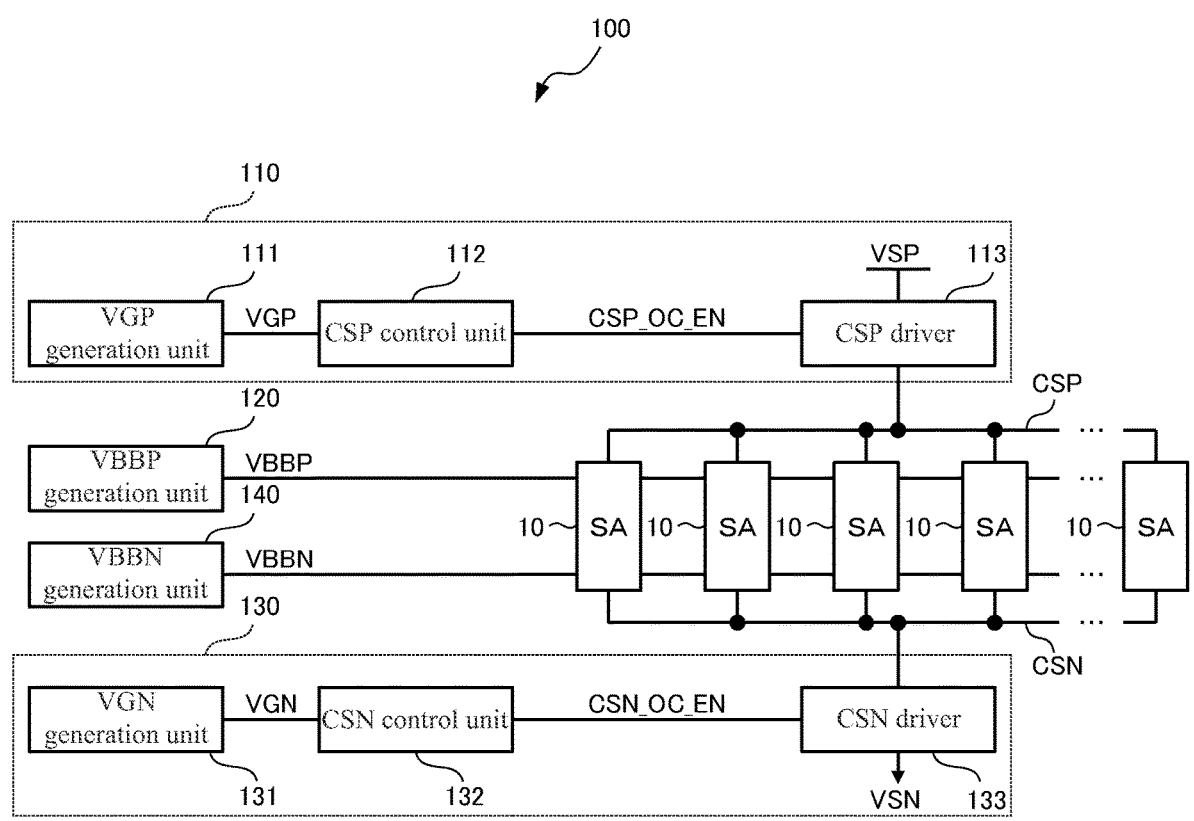
FIG. 1 is a schematic diagram of a semiconductor memory device according to an embodiment of the present invention.

FIG. 1 is a semiconductor memory device according to an embodiment of the present invention. The semiconductor memory device comprises at least one sense amplifier (SA) 10 and a control unit 100. The control unit 100 provides voltages that are adjusted based on the characteristics of a pair of pMOSFETs (first transistors) 10a and a pair of nMOSFETs (second transistors) 10b of each sense amplifier among the at least one sense amplifier 10 to the pair of pMOSFETs 10a and the pair of nMOSFETs 10b of each sense amplifier of the at least one sense amplifier 10 so that voltages of a pair of bit lines BLT and BLB connected to each sense amplifier of the at least one sense amplifier 10 are close to a specific target voltage (a voltage VBLEQ described later) during an offset elimination operation. The control unit 100 comprises a VGP control unit 110, a VBBP generation unit 120, a VGN control unit 130, and a VBBN generation unit 140.

The VGP control unit 110 provides a voltage that is adjusted based on the characteristics of a pair of pMOSFETs 10a of each sense amplifier of the at least one sense amplifier 10 to the pair of pMOSFETs 10a of each sense amplifier of the at least one sense amplifier 10. The VGP control unit 110 controls voltages of a pair of bit lines BLT and BLB to be close to the target voltage (the voltage VBLEQ) during the offset elimination operation. The VGP control unit 110 comprises a VGP generation unit 111, a CSP control unit 112, and a CSP driver 113. The VGP control unit 110 is an example of a "first control unit".

The VBBP generation unit 120 provides a reverse bias voltage VBBP that is adjusted based on the characteristics of a pair of pMOSFETs 10a of each sense amplifier of the plurality of sense amplifiers 10 to the pair of pMOSFETs 10a of each sense amplifier of the at least one sense amplifier 10 so that voltages of a pair of bit lines BLT and BLB are close to the target voltage (the voltage VBLEQ) during the offset elimination operation. The VBBP generation unit 120 is an example of a "second control unit".

The VGN control unit 130 provides a voltage that is adjusted based on the characteristics of a pair of nMOSFETs 10b to the pair of nMOSFETs 10b and controls voltages of a pair of bit lines BLT and BLB to be close to the specific target voltage (the voltage VBLEQ) during the offset elimination operation. The VGN control unit 130 comprises a VGN generation unit 131, a CSN control unit 132, and a CSN drive unit 133. The VGN control unit is an example of a "third control unit".

The VBBN generation unit 140 provides a reverse bias voltage VBBP that is adjusted based on the characteristics of a pair of nMOSFETs 10b to the pair of nMOSFETs 10b so that voltages of a pair of bit lines BLT and BLB are close to the specific target voltage (the voltage VBLEQ) during the offset elimination operation. The VBBN generation unit 140 is an example of a "fourth control unit".

Referring to FIG. 2, each sense amplifier 10 comprises a pair of pMOSFETs 10a (an example of "a pair of first transistors") connected to a node CSP on a high-voltage power supply side and a pair of nMOSFETs 10b (an example of "a pair of first transistors") connected to a node CSN on a low-voltage power supply side. The nodes between the pair of pMOSFETs 10a and the pair of nMOSFETs 10b are connected to a pair of complementary bit lines BLT and BLB (a pair of bit lines BLT and BLB).

It is assumed that no offset voltage is generated in each sense amplifier 10 in FIG. 2(A). As shown in FIG. 2(B), the bit lines BLT and BLB are at the same potential. It is further assumed that the effective resistance value of the pair of pMOSFETs 10a is RP, and the effective resistance value of the pair of nMOSFET 10b is RN. Thus, the circuit in FIG. 2(B) can be replaced by the circuit shown in FIG. 2(C). As shown in FIG. 2(C), the voltage VOC at the node between the two resistors is the voltage of the pair of bit lines BLT and BLB. For example, when the two effective resistance values RP and RN are equal, the value of the voltage VOC is equal to a half of the difference between the voltage of the node CSP and the voltage of the node CSN.

Figure 3:
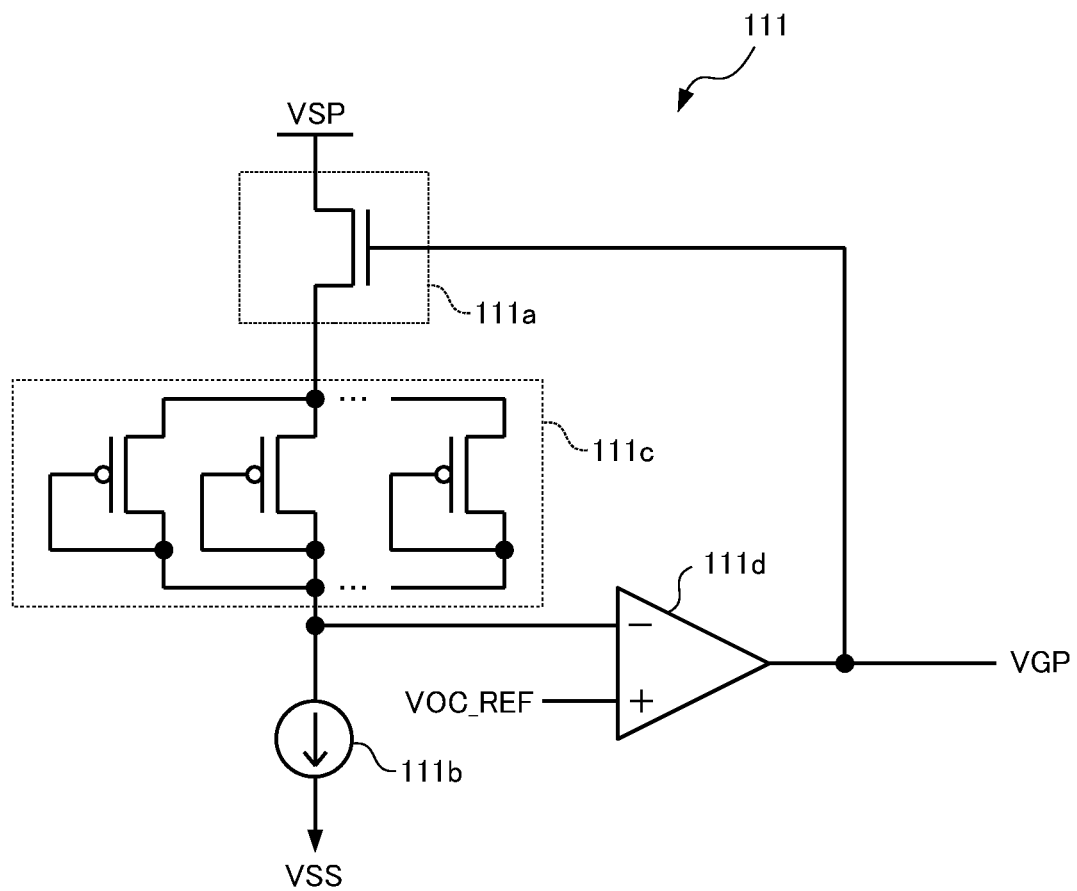
FIG. 3 is a schematic diagram of a VGP generation unit according to an embodiment of the present invention.

Referring to FIG. 3, the VGP generation unit 111 generates a first adjustment voltage VGP to adjust the voltage provided to a pair of pMOSFETs 10a of each sense amplifier of the at least one sense amplifier. Using the first adjustment voltage VGP, the voltages of the pair of bit lines BLT and BLB can be close to the specific target voltage (the voltage VBLEQ). The VGP generation unit 111 is an example of a "first voltage generation unit" and comprises a first driver 111a, a first constant current source 111b, a first transistor set 111c, and a first operational amplifier 111d.

The first driver 111a adjusts the voltage (the voltage VCSP at the node CSP shown in FIG. 2 (also shown in FIG. 8 described later)) provided to a pair of pMOSFETs 10a of each sense amplifier of the at least one sense amplifier 10 during the offset elimination operation by using the first adjustment voltage VGP. The first driver 111a comprises an nMOSFET having a drain connected to the provided voltage VSP, a source connected to the first transistor set 111c, and a gate inputting the first adjustment voltage VGP. This nMOSFET may have the same characteristics (for example, PVT characteristics, etc.) as the nMOSFET of the CSP driver 113 described later. The width W of the gate of the nMOSFET of the first driver 111a can be obtained by the following Formula (1).

$$W = Wg \times K/2N \qquad \text{Formula (1)}$$

Wg is the width of the gate of the nMOSFET of the CSP driver 113, K is the number of pMOSFETs in the first transistor set 111c described later, 2N is the total number of pairs of pMOSFETs 10a in the at least one sense amplifier 10 (N is the number of sense amplifiers 10).

One terminal of the first constant current source 111b is connected to the first transistor set 111c, and the other terminal thereof is connected to a low power supply voltage VSS (VSS<VSP). The current IREF_GP provided by the first constant current source 111b can be obtained by the following Formula (2).

$$IREF\_GP = K \times IOC/2 \qquad \text{Formula (2)}$$

IOC is a target value of a current of one sense amplifier 10 for the offset elimination operation.

The first transistor set 111c comprises a plurality of pMOSFETs connected between the first driver 111a and the first constant current source 111b. In the first transistor set 111c, the source of each pMOSFET is connected to the source of the nMOSFET of the first driver 111a, and the drain of each pMOSFET is connected to the gate of the pMOSFET and one of the terminals of the first constant current source 111b. Each pMOSFET in the first transistor set 111c may have the same characteristics as the pMOSFETs 10 in each sense amplifier 10.

The first operational amplifier 111d has a first input terminal (the terminal "−") connected to a node between the first transistor set 111c and the first constant current source 111b and a second input terminal (the terminal "+") to which a target voltage VOC_REF (=voltage VBLEQ) is input. The first operational amplifier 111d generates the first adjustment voltage VGP based on the voltages input to the first input terminal and the second input terminal and outputs the first adjustment voltage VGP. The VGP generation unit 111 adjusts the first adjustment voltage VGP based on the characteristics of the pMOSFETs in the first transistor set 111c, and then adjusts the output voltage of the first driver 111a so that the voltage of the first input terminal of the first operational amplifier 111d reaches the target voltage VOC_REF (the voltage VBLEQ). Therefore, in the offset elimination operation, the voltages of a pair of bit lines BLT and BLB can be set to a target voltage (the voltage VBLEQ).

Figure 4:
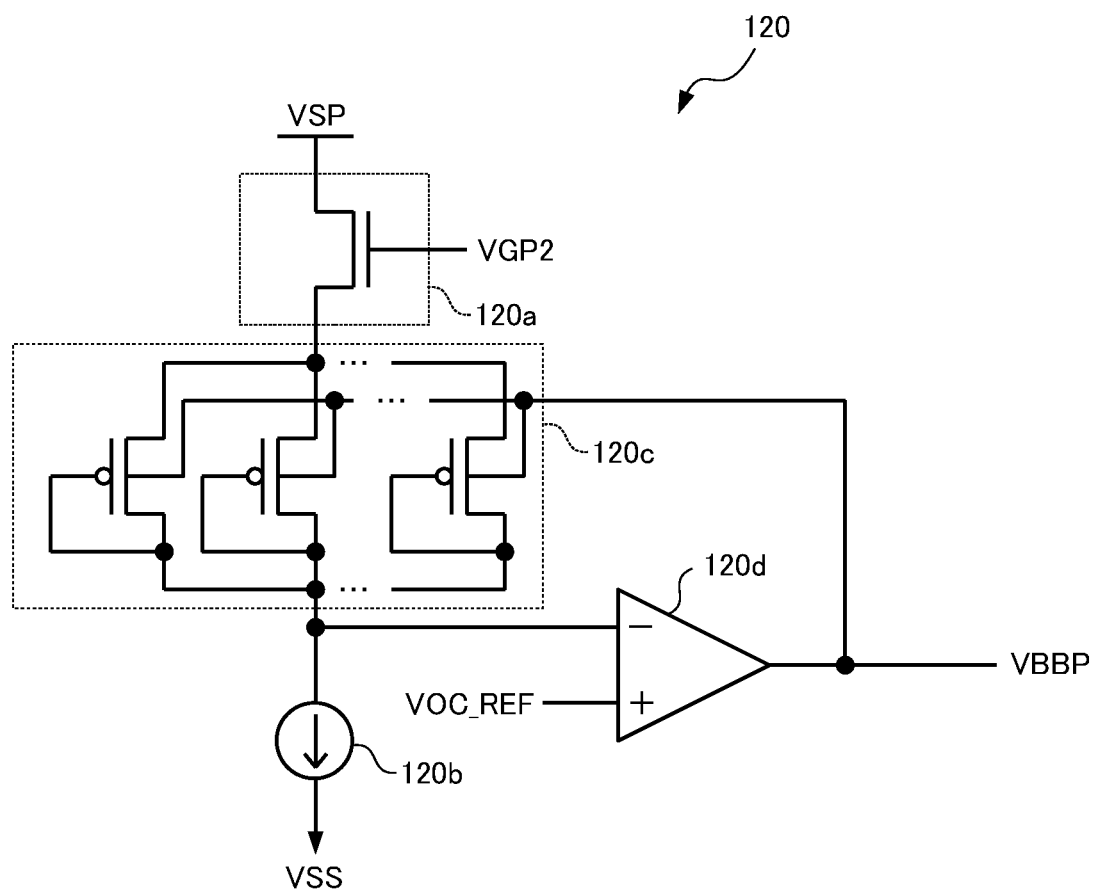
FIG. 4 is a schematic diagram of a VBBP generation unit according to an embodiment of the present invention.

The circuit structure of the VBBP generation unit 120 will be described with reference to FIG. 4. The VBBP generation unit 120 comprises a second driver 120a, a second constant current source 120b, a second transistor set 120c, and a second operational amplifier 120d.

The second driver 120a adjust the voltage (the voltage VCSP at the node CSP of FIG. 2), which is provided to a pair of pMOSFETs 10a of each sense amplifier of the at least one sense amplifier 10, using the voltage VGP2 during the offset elimination operation. The voltage VGP2 may be a specific voltage, for example, a voltage approximately equal to the first adjustment voltage VGP. The second driver 120a comprises an nMOSFET that has a drain connected to the provided voltage VSP, a source connected to the second transistor set 120c, and a gate inputting the voltage VGP2. This nMOSFET may have the same characteristics as the nMOSFET of the CSP driver 113 described later. The width W2 of the gate of the nMOSFET of the second driver 120a can be obtained by the following Formula (3).

$$W2 = Wg \times L/2N \qquad \text{Formula (3)}$$

Wg is the width of the gate of the nMOSFET of the CSP driver 113, L is the number of pMOSFETs in the second transistor set 120c described later, and 2N is the total number of pairs of pMOSFETs 10a in the at least one sense amplifier 10 (N is the number of sense amplifiers 10).

One terminal of the second constant current source 120b is connected to the second transistor set 120c, and the other terminal thereof is connected to the low power supply voltage VSS (VSS<VSP). The current IREF_GP provided by the second constant current source 120b can be obtained by replacing K in the above-mentioned Formula (2) with the above-mentioned L.

The second transistor set 120c comprises a plurality of pMOSFETs connected between the second driver 120a and the second constant current source 120b. In the second transistor set 120c, the source of each pMOSFET is connected to the source of the nMOSFET of the second driver 120a, and the drain of each pMOSFET is connected to the gate of the pMOSFET and one of the terminals of the second constant current source 120b. Each pMOSFET in the second transistor set 120c may have the same characteristics as the pMOSFETs 10a in each sense amplifier 10.

The second operational amplifier 120d has a first input terminal (the terminal "−") connected to a node between the second transistor set 120c and the second constant current source 120b and a second input terminal (the terminal "+") to which the target voltage VOC_REF (=voltage VBLEQ) is input. The second operational amplifier 120d generates the reverse bias voltage VBBP, which is provided to a pair of pMOSFETs 10a of each sense amplifier of the at least one sense amplifier 10 and each pMOSFET in the second transistor set 120c, based on the voltages input to the first input terminal and the second input terminal and output the reverse bias voltage VBBP. The VBBP generation unit 120 adjusts the reverse bias voltage VBBP based on the characteristics of the pMOSFETs included in the second transistor set 120c so that the voltages of a pair of bit lines BLT and BLB can be set approximately at the target voltage (the voltage VBLEQ). Thus, the voltage of the first input terminal (the terminal "−") of the second operational amplifier 120d reaches the target voltage VOC_REF (the voltage VBLEQ).

Figure 5:
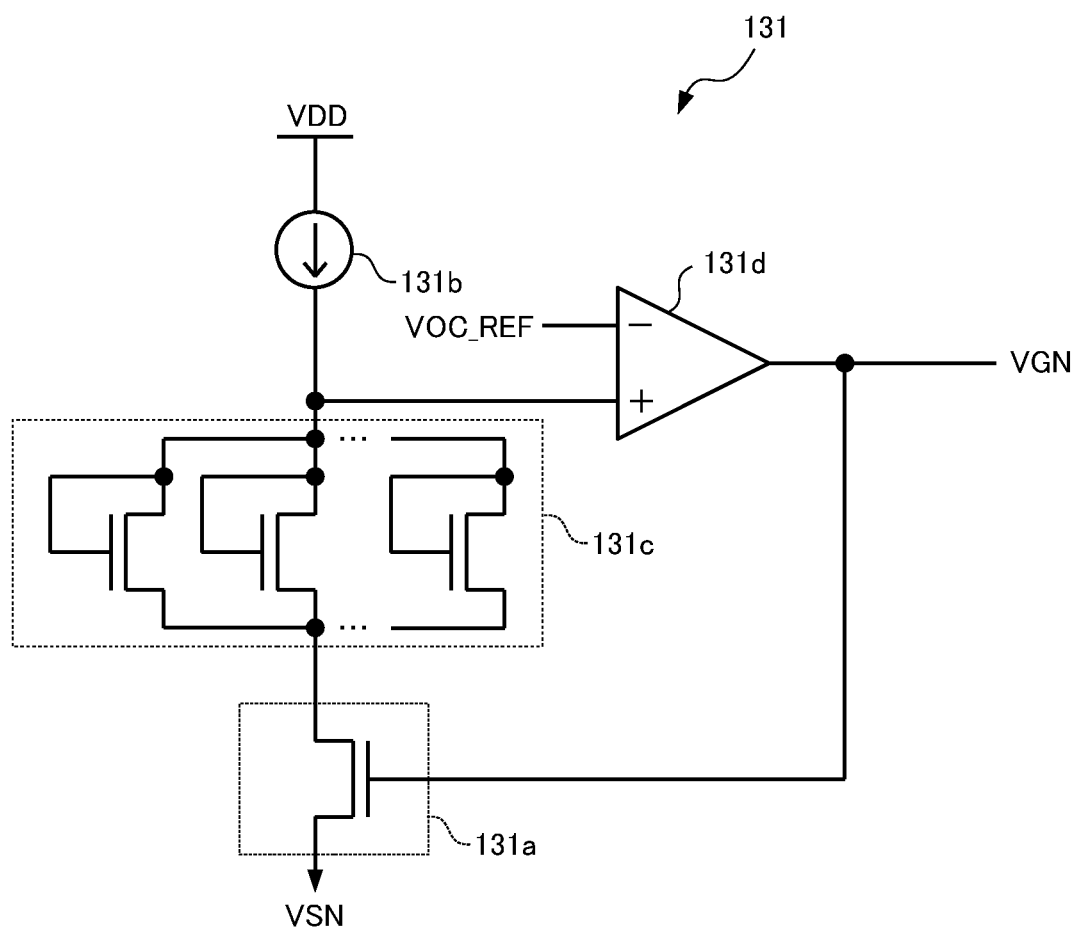
FIG. 5 is a schematic diagram of an embodiment of a VGN generation unit according to the present invention.

Referring to FIG. 5, the VGN generation unit 131 generates a second adjustment voltage VGN for adjusting the voltage provided to a pair of nMOSFETs 10b so that the voltages of a pair of bit lines BLT and BLB are close to the specific target voltage (the voltage VBLEQ). The VGN generation unit 131 is an example of a "second voltage generator", and comprises a third driver 131a, a third constant current source 131b, a third transistor set 131c, and a third operational amplifier 131d.

The third driver 131a adjusts the voltage (the voltage VCSN at the node CSN shown in FIG. 2 (also shown in FIG. 8 described later)), which is provided to a pair of nMOSFETs 10b, using the second adjustment voltage VGN during the offset elimination operation. The third driver 131a comprises an nMOSFET having a drain connected to the third transistor set 131c, a source connected to the voltage VSN provided to a pair of nMOSFETs 10b of each sense amplifier of the at least one sense amplifier 10 during the offset elimination operation, and a gate inputting the second adjustment voltage VGN. This nMOSFET may have the same characteristics as the nMOSFET of the CNS driver 133 described later. The width W3 of the gate of the nMOSFET of the third driver 131a can be obtained by the following Formula (4).

$$W3 = Wg \times Q/2N \qquad \text{Formula (4)}$$

Wg is the width of the gate width of the nMOSFET of the CNS driver 133, Q is the number of pMOSFETs in the third transistor set 131c described later, 2N is the total number of pairs of pMOSFETs 10a in the at least one sense amplifier 10 (N is the number of sense amplifiers 10).

One terminal of the third constant current source 131b is connected to the high-power supply voltage VDD (VDD>VSN), and the other terminal thereof is connected to the third transistor set 131c. The current IREF_GN provided by the third constant current source 131b can be obtained by the following Formula (5).

$$IREF\_GN = Q \times IOC/2 \qquad \text{Formula (5)}$$

The third transistor set 131c comprises a plurality of nMOSFETs connected between the third driver 131a and the third constant current source 131b. In the third transistor set 131c, the source of each nMOSFET is connected to the other terminal of the third constant current source 131b and the gate of the nMOSFET, and the source of each nMOSFET is connected to the drain of the nMOSFET of the third driver 131a. In the third transistor set 131c, each nMOSFET in the third transistor set 131c may have the same characteristics as nMOSFETs 10b in each sense amplifier 10.

The third operational amplifier 131d has a first input terminal (the terminal "+") connected to a node between the third transistor set 131c and the third constant current source 131b, and a second input terminal (the terminal "−") to which the target voltage VOC_REF (=voltage VBLEQ) is input. The third operational amplifier 131d generates the second adjustment voltage VGN that is provided to each of the at least one sense amplifier 10 based on the voltages input to the first input terminal and the second input terminal and output the second adjustment voltage VGN. The VGN generator 131 adjusts the second adjustment voltage VGN based on the characteristics of the nMOSFETs in the third transistor set 131c, and then adjusts the output voltage of the third driver 131a so that the voltage of the first input terminal (the terminal "+") of the third operational amplifier 131d reaches the target voltage VOC_REF (the voltage VBLEQ). During the offset elimination operation, the voltages of a pair of bit lines BLT, BLB can be set approximately to a target voltage (the voltage VBLEQ).

Figure 6:
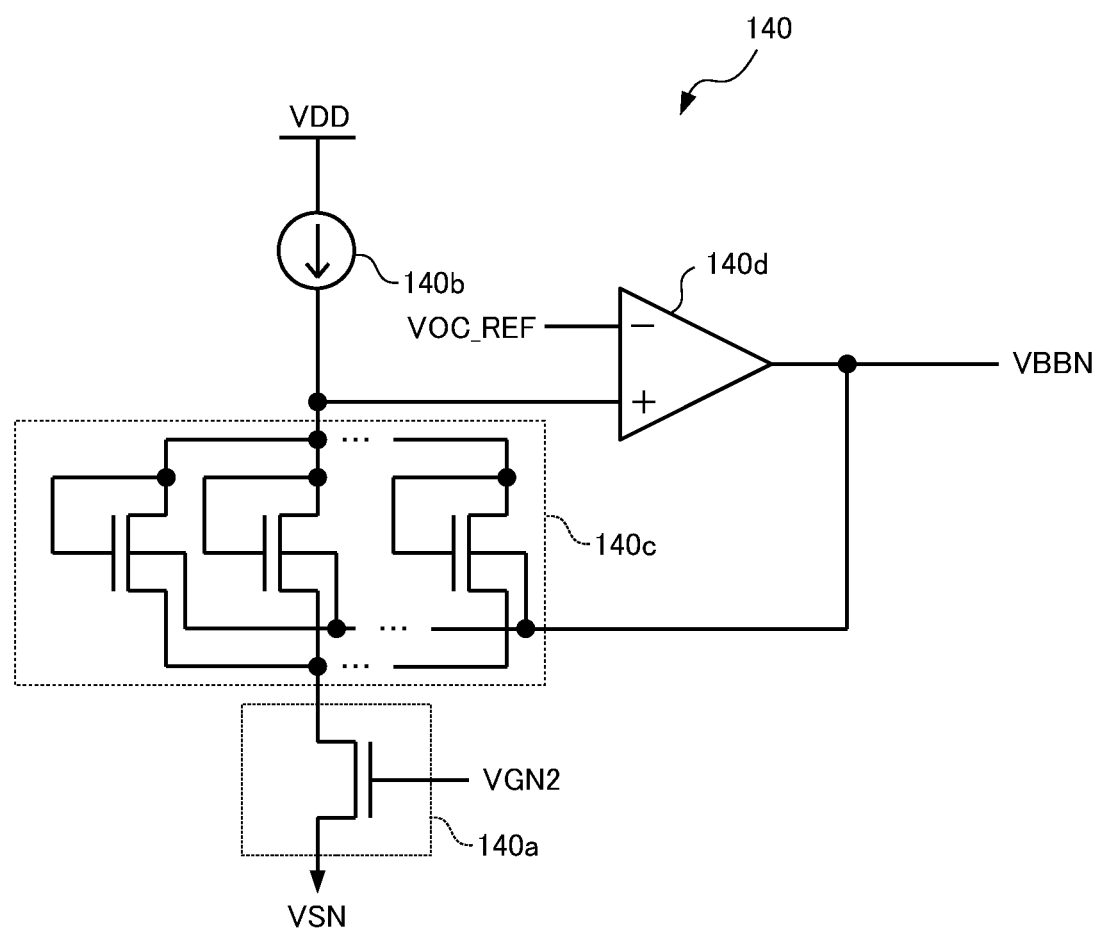
FIG. 6 is a schematic diagram of a VBBN generator according to an embodiment of the present invention.

The circuit structure of the VBBN generator 140 will be described with reference to FIG. 6. The VBBN generator 140 comprises a fourth driver 140a, a fourth constant current source 140b, a fourth transistor set 140c, and a fourth operational amplifier 140d.

The fourth driver 140a adjusts the voltage (the voltage VCSN at the node CSN in FIG. 2), which is provided to a pair of nMOSFETs 10b, using a voltage VGN2 during the offset elimination operation. The voltage VGN2 may be a specific voltage, for example, a voltage approximately equal to the second adjustment voltage VGN. The fourth driver 140a comprises an nMOSFET having a drain connected to the fourth transistor set 140c, a source connected to the provided voltage VSN, and a gate inputting the voltage VGN2. This nMOSFET may have the same characteristics as the nMOSFET of the CNS driver 133 described later. The width W4 of the gate of the nMOSFET of the fourth driver 140a can be similarly obtained from Formula (4).

One terminal of the fourth constant current source 140b is connected to the high-power supply voltage VDD (VDD>VSN), and the other terminal thereof is connected to the fourth transistor set 140c. The current IREF_GP provided by the fourth constant current source 140b can be similarly obtained by the Formula (5).

The fourth transistor set 140c comprises a plurality of nMOSFETs connected between the fourth driver 140a and the fourth constant current source 140b. In the fourth transistor set 140c, the drain terminal of each nMOSFET is connected to the other terminal of the fourth constant current source 140 and the gate of the nMOSFET, and the source of each nMOSFET is connected to the drain of the nMOSFET of the fourth driver 140a. Each nMOSFET in the fourth transistor set 140c may have the same characteristics as nMOSFETs 10b in each sense amplifier 10.

The fourth operational amplifier 140d has a first input terminal (the terminal "+") connected to a node between the fourth transistor set 140c and the fourth constant current source 140b, and a second input terminal (the terminal "−") to which the target voltage VOC_REF (=voltage VBLEQ) is input. The fourth operational amplifier 140d generates the reverse bias voltage VBBN, which is provided to a pair of nMOSFETs 10b and each pMOSFET in the fourth transistor set 140c, based on the voltages input to the first input terminal and the second input terminal, and outputs the reverse bias voltage VBBN. The VBBN generation unit 140 adjusts the reverse bias voltage VBBN based on the characteristics of the nMOSFETs in the fourth transistor set 140c during the offset elimination operation so that the voltages of a pair of bit lines BLT and BLB can be set approximately to the target voltage (the voltage VBLEQ). Thus, the first input terminal of the fourth operational amplifier 140d reaches the target voltage VOC_REF (the voltage VBLEQ).

Figure 7:
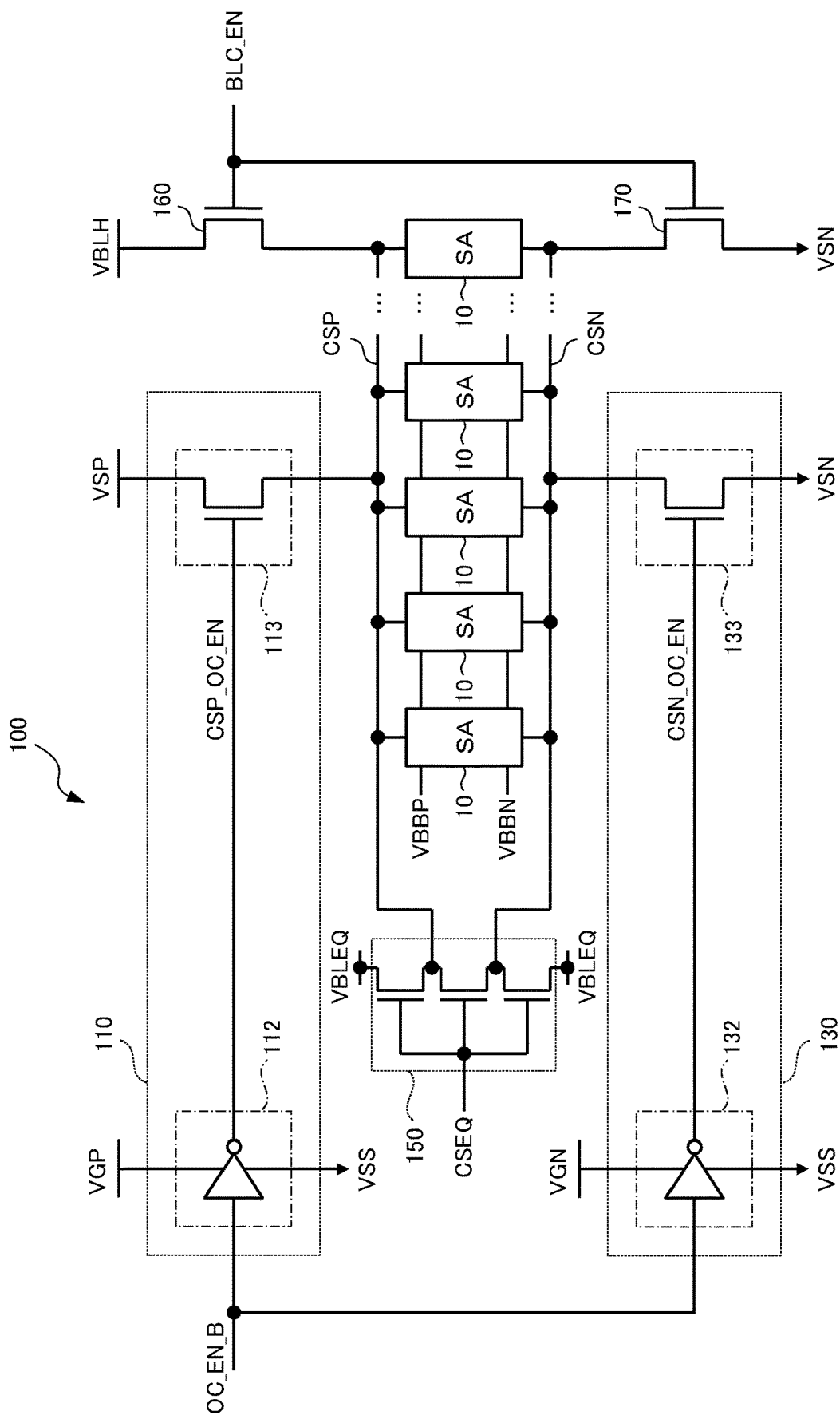
FIG. 7 is a schematic diagram of the control unit according to an embodiment of the present invention.

Referring to FIG. 7, the CSP control unit 112 of the VGP control unit 110 comprises a NOT circuit to which the first adjustment voltage VGP is applied. A signal OC_EN_B is input to the NOT circuit. The CSP control unit 112 outputs a signal CSP_OC_EN with a high level when the signal OC_EN_B with a low level is input. The voltage of the high-level signal CSP_OC_EN is the same as the first adjustment voltage VGP. The CSP driver 113 of the VGP control unit 110 comprises an nMOSFET having a drain connected to the voltage VSP, a source connected to the node CSP, and a gate inputting the input signal CSP_OC_EN. This nMOSFET may have the same characteristics as the nMOSFET of the first driver 111a.

The CSN control unit 132 of the VGN control unit 130 comprises a NOT circuit to which the second adjustment voltage VGN is applied. The signal OC_EN_B is input to the NOT circuit. The CSN control unit 132 outputs a signal CSN_OC_EN with a high level when the signal OC_EN_B with the low level is input. The voltage of the high-level signal CSN_OC_EN is the same as the second adjustment voltage VGN. The CNS driver 133 of the VGN control unit 130 comprises an nMOSFET having a drain connected to the node CSN, a source connected to the voltage VSN, and a gate inputting the signal CSN_OC_EN. This nMOSFET may have the same characteristics as the nMOSFET of the third driver 131a of the VGN generation unit 131.

The control unit 100 comprises a voltage supply unit 150 that supplies the voltage VBLEQ. In the embodiment shown in FIG. 7, the voltage supply unit 150 comprises three nMOSFETs connected to each other, and a signal CSEQ is input to the gate of each nMOSFET. The drain of the first nMOSFET is connected to the voltage VBLEQ, and the source of the first nMOSFET is connected to the drain of the second nMOSFET. The source of the second nMOSFET is connected to the drain of the third nMOSFET, and the source of the third nMOSFET is connected to the voltage VBLEQ. In addition, the node between the source of the first nMOSFET and the drain of the second nMOSFET is connected to the node CSP, and the node between the source of the second nMOSFET and the drain of the third nMOSFET is connected to the node CSN.

The control section 100 further comprises an nMOSFET 160. The nMOSFET 160 has a drain connected to a voltage VBLH that is supplied to at least one sense amplifier 10 during a voltage amplification operation of the bit lines, a source connected to the node CSP, and a gate inputting a signal BLC_EN. The control unit 100 further comprises an nMOSFET 170. The nMOSFET 170 has a drain connected to the node CSN, a source connected to the voltage VSN, and a gate inputting the signal BLC_EN.

When the magnitude of the voltage VSP provided to each sense amplifiers of the at least one sense amplifier 10 during the offset elimination operation is different from the magnitude of the voltage VBLH provided to each sense amplifiers of the at least one sense amplifier 10 during the voltage amplification operation of a pair of bit lines, the control unit 100 can switch the voltages provided to each sense amplifier of the at least one sense amplifier 10 during each of the above operations. At this time, by applying the voltages VSP and VBLH of different magnitudes to the node CSP at the same time, it is possible to suppress the short circuit occurring at the node CSP.

When the magnitude of the voltage VSP provided to each sense amplifiers of the at least one sense amplifier 10 during the offset elimination operation is the same as the magnitude of the voltage VBLH provided to each sense amplifiers of the at least one sense amplifier 10 during the voltage amplification operation of a pair of bit lines, the control unit 100 may not switch the voltages provided to each sense amplifier of the at least one sense amplifier 10 during each of the above operations. At this time, since the process of switching the voltages provided to each sense amplifier of the at least one sense amplifier 10 is unnecessary for every operation, the voltages provided to each sense amplifier of the at least one sense amplifier 10 can be easily controlled.

FIG. 8(A) shows an example of the operation of the control unit 100 when the magnitude of the voltage VSP is different from that of the voltage VBLH, and FIG. 8(B) shows an example of the operation of the control unit 100 when the magnitude of the voltage VSP is the same as that of the voltage VBLH an example.

First, FIG. 8(A) will be described. Assume that the offset elimination operation is performed during the period from time t1 to time t2, the charge sharing operation is performed during the period from time t2 to time t3, the pre-sensing operation is performed during the period from time t3 to time t4, and the bit-line amplification operation is performed after time t4.

At time t1, the signal OC_EN_B and the signal CSEQ are at the low level, and the signal BLC_EN is at the low level. The signal CSP_OC_EN having the high level of the first adjustment voltage VBP is input to the CSP driver 113. The voltage VCSP that is adjusted by the first adjustment voltage VBP is provided to the node CSP. That is, the voltage VCSP drops due to the turn-on resistance of the nMOSFET of the CSP driver 113. The signal CSN_OC_EN having the high level of the second adjustment voltage VBN is input to the CNS driver 133, and the voltage VCSN that is adjusted by the second adjustment voltage VBN is provided to the node CSN.

At time t2, the signal OC_EN_B and the signal CSEQ are at the high level, and the signal BLC_EN is at the low level. The voltage VBLEQ is provided to the nodes CSP and CSN from the voltage supply unit 150. In addition, a voltage is applied to the word line WL used to access the target.

At time t3, the signal OC_EN_B and the signal CSEQ are at the low level, and the signal BLC_EN is at the low level. Similar to time t1, the voltage VCSP that is adjusted by first adjustment voltage VBP is provided to the node CSP, and the voltage VCSN that is adjusted by second adjustment voltage VBN is provided to node CSN.

At time t4, the signal OC_EN_B is at high level, the signal CSEQ is at the low level, and the signal BLC_EN is at the high level. The voltage VBLEQ is provided to the node CSP, and the low supply voltage VSS is provided to the node CSN. The voltage provided to each sense amplifier of the at least one sense amplifier 10 is switched during each operation.

Next, FIG. 8(B) will be described. The operations at time t11~time t13 are the same as the operations at time t1~time t3 shown in FIG. 8(A). At time t14, when the amplification operation of the bit lines starts, the signal OC_EN_B and the signal CSEQ are kept at the low level, and the signal BLC_EN is at the high level, which is different from the situation in FIG. 8(A). The sense amplifier 10 becomes a circuit state corresponding to a CMOS latch during the amplification operation of the bit lines, and a current flows from the high-potential voltage VSP to the low-potential voltage VSN. Due to the voltage drop in the CSP driver 113, the voltage VSP is equal to the voltage VCSP, that is, the voltage VCSP is equal to the voltage VBLH. Because the voltage VSP has the same voltage level as the voltage VCSP and the voltage VBLH, the short-circuit current can be suppressed. In this way, when the voltage VSP is equal to the voltage VBLEQ, the voltage VCSP and the voltage VBLEQ can be simultaneously provided to each sense amplifier of the at least one sense amplifier 10.

Figure 9A:
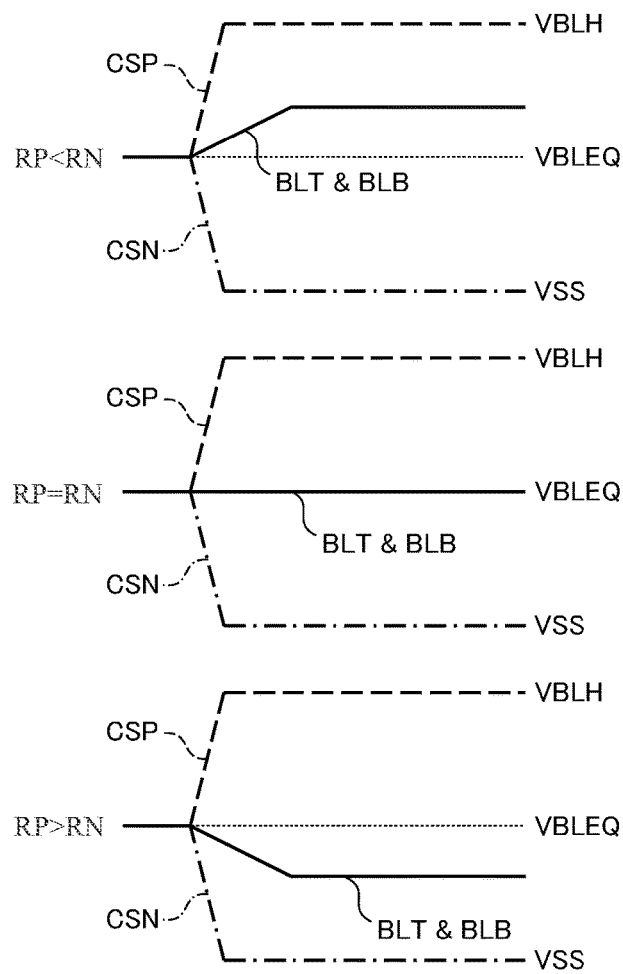
FIG. 9(A) is a schematic diagram of voltage variation on a pair of bit lines during an offset elimination operation of a sense amplifier in prior arts.
Figure 9B:
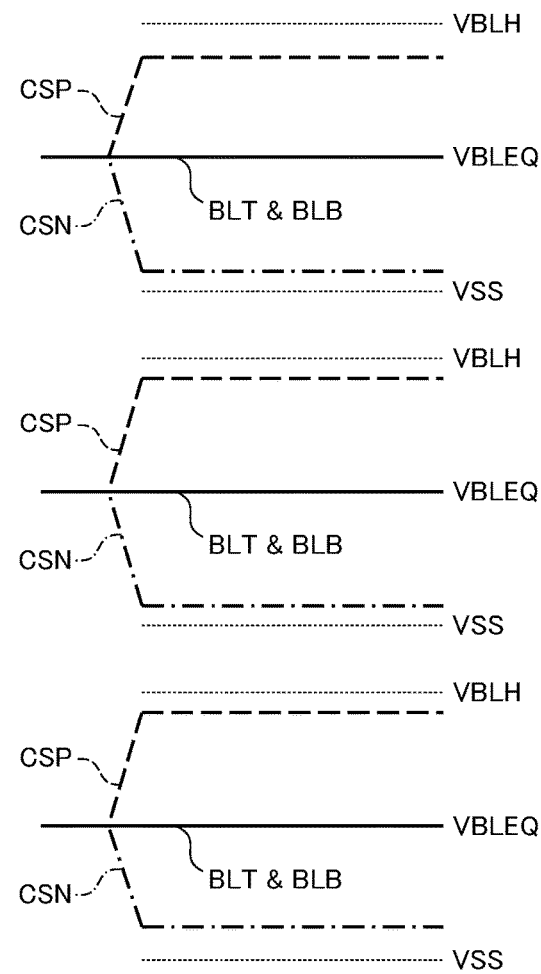
FIG. 9(B) is a schematic diagram of voltage variation on a pair of bit lines in an offset elimination operation of a sense amplifier according to an embodiment of the present invention.

As shown in FIG. 9(A), in prior arts, when the effective resistance value RP of a pair of pMOSFETs is different from the effective resistance value RN of a pair of nMOSFETs, the voltages of a pair of bit lines BLT and BLB cannot be kept at the voltage VBLEQ. On the other hand, as shown in FIG. 9(B), according to the semiconductor memory device and its control method of the present embodiment, even if the effective resistance values RP and RN of a pair of pMOSFET 10a and a pair of nMOSFET 10b in one of the sense amplifiers 10 are different and also different from those in any one of the others of the sense amplifiers 10 due to difference in the characteristics of the pair of pMOSFET 10a (the first transistors) and the pair of nMOSFET 10b (the second transistors), the voltages of a pair of bit lines BLT and BLB are controlled to be close to a target voltage during the offset elimination operation. For example, the target is the voltage VBLEQ that is equal to a half of the voltage VBLH provided to the sense amplifier 10 during the voltage amplification operation of the bit line BLT (that is, the voltage that is generated when the effective resistance value RP of the pair of pMOSFETs 10a is equal to the effective resistance value RN of the pair of nMOSFETs 10b)). The sensing operation of the sense amplifiers 10 can be improved even when the characteristics of the transistors in one sense amplifier 10 are different and/or when the characteristics of the transistors in one of the sense amplifiers 10 are different from those in any one of the others of the sense amplifiers 10.

Figure 10:
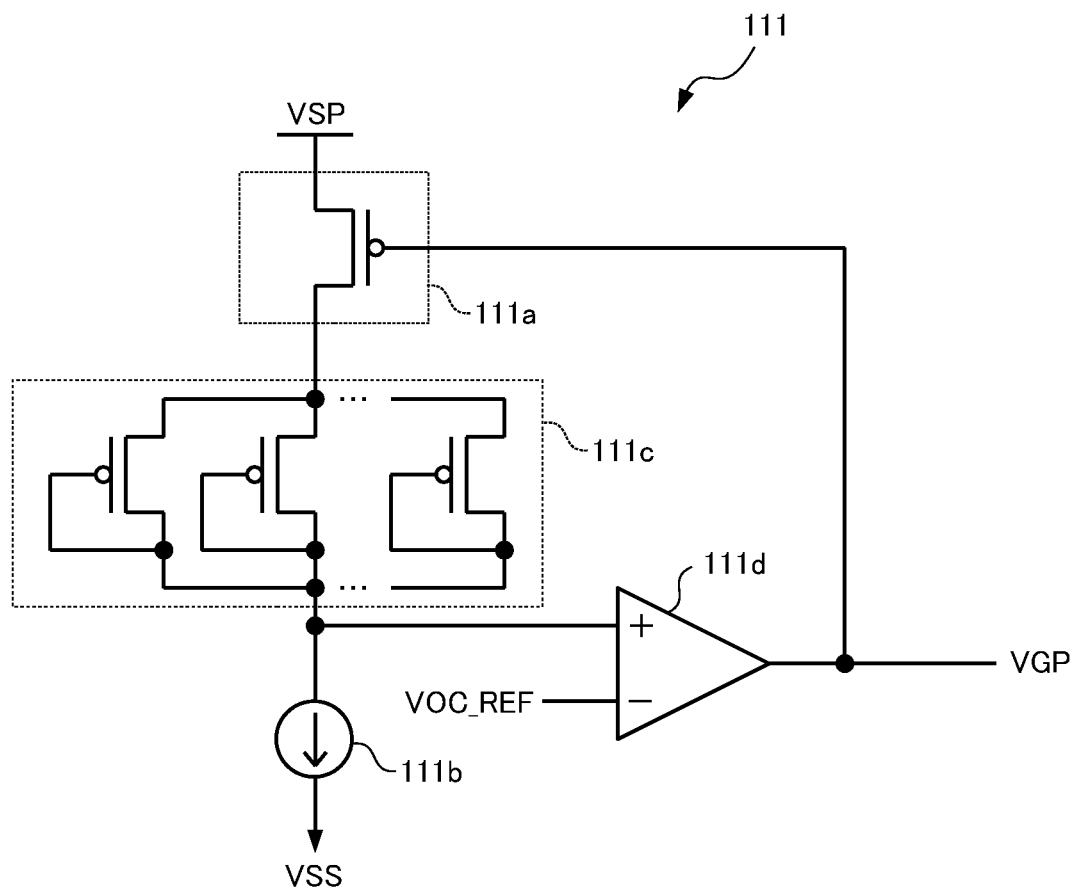
FIG. 10 is a schematic diagram of a VGP generation unit according to another embodiment of the present invention.
Figure 11:
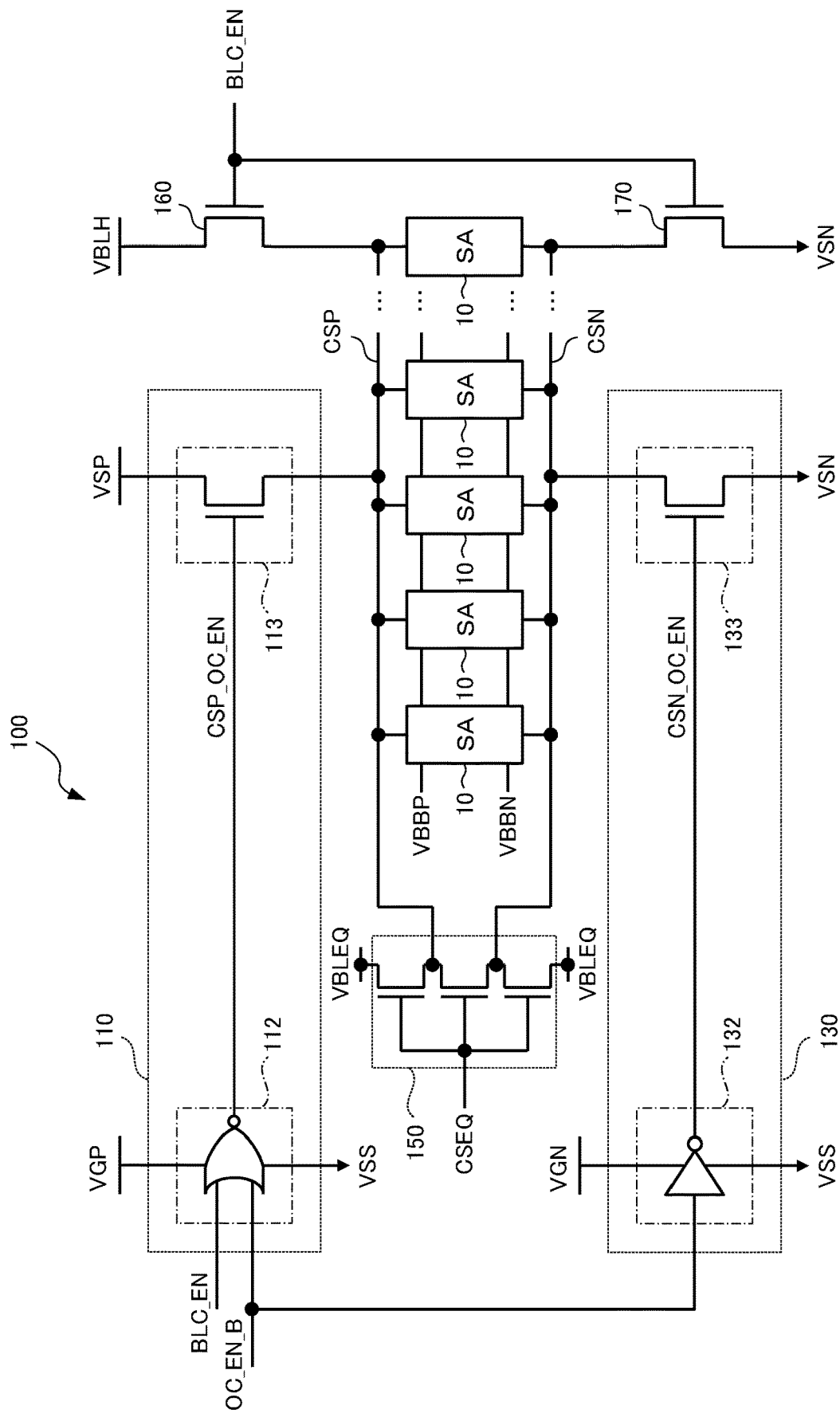
FIGS. 11 and 12 are schematic diagrams of a control unit according to different embodiments of the present invention.
Figure 12:
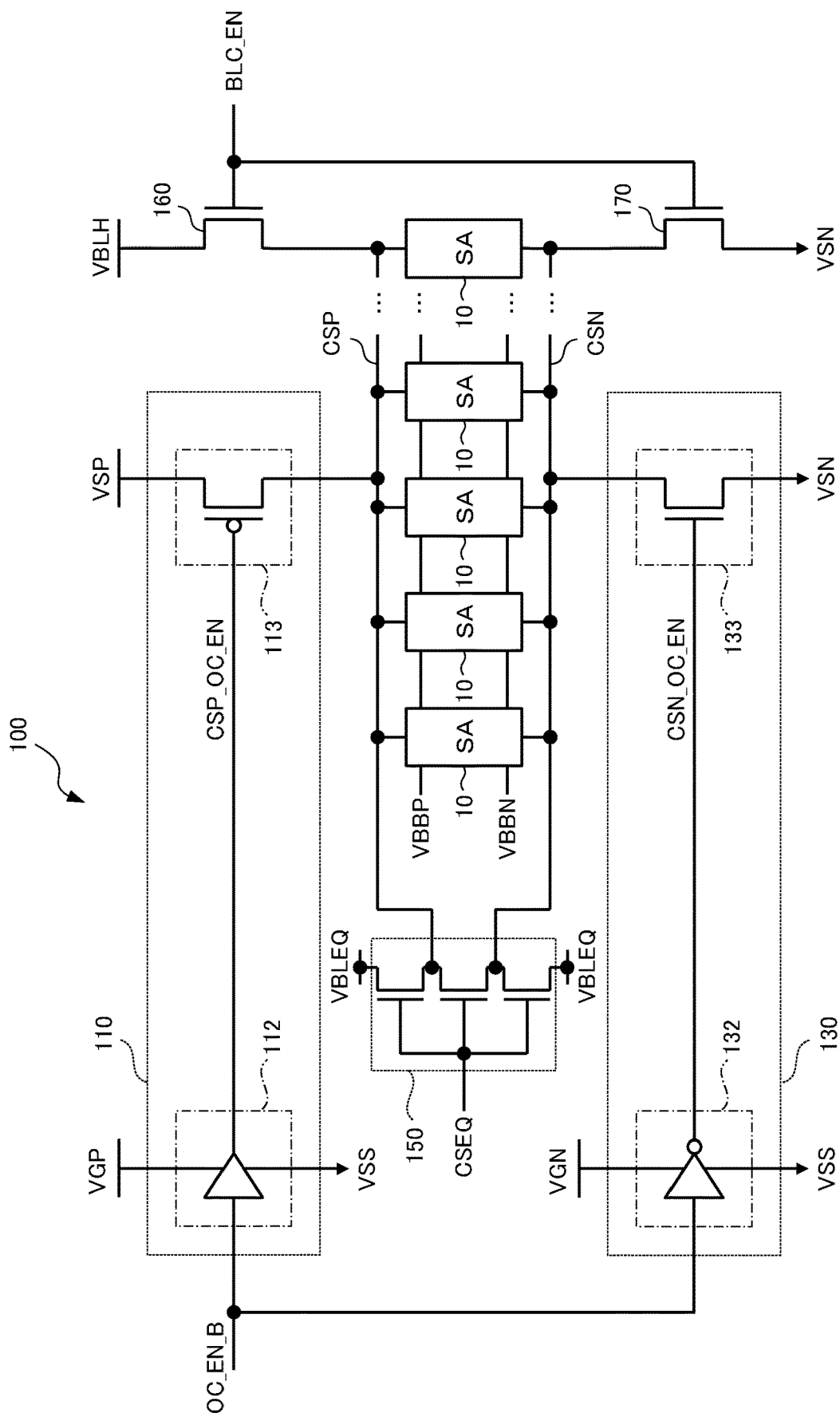

The circuit structure of the control unit 100 has been described in the above embodiments, however, the present invention is not limited thereto. For example, the control unit 100 may also comprises each of the VGP control unit 110 and the VBBP generation unit 120 and further comprise each of the VGN control unit 130 and the VBBN generation unit 140. The control unit 100 may also provide the same effects as those of the above-mentioned embodiments. In addition, for example, as shown in FIG. 10, each of the first driver 111a, the second driver 120a, the third driver 131a, and the fourth driver 140a may be changed to use pMOS-FETs. In the above-mentioned embodiment, the CSP control unit 112 is composed of a NOT circuit, however, the present invention is not limited thereto. For example, as shown in FIG. 11, the CSP control unit 112 may be composed of a NOR circuit that inputs the signal BLC_EN and the signal OC_EN_B. In this case, the control unit 100 may be the same as the embodiment in FIG. 8(B). The CSP control unit 112 in FIG. 12 may be composed of a buffer circuit that inputs the signal OC_EN_B. In this case, the CSP driver 113 is composed of a pMOSFET. The control unit 100 may also be the same as the embodiment shown in FIGS. 8(A) and 8(B).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A semiconductor memory device comprising:
   at least one sense amplifier, wherein each sense amplifier of the at least one sense amplifier comprises a pair of first transistors and a pair of second transistors; and
   a control unit providing a voltage that is adjusted based on characteristics of the pair of first transistors of each sense amplifier of the at least one sense amplifier to the pair of first transistors of each sense amplifier of the at least one sense amplifier, and providing a voltage that is adjusted based on characteristics of the pair of second transistors of each sense amplifier of the at least one sense amplifier to the pair of second transistors of each sense amplifier of the at least one sense amplifier, so that voltages of a pair of bit lines connected to each sense amplifier of the at least one sense amplifier are close to a specific target voltage during an offset elimination operation,
   wherein when a magnitude of the voltage provided to the pair of first transistors of each sense amplifier of the at least one sense amplifier during the offset elimination operation is different from a magnitude of the voltage provided to the pair of first transistors of each sense amplifier of the at least one sense amplifier during a voltage amplification operation of a pair of bit lines, the control unit is configured to switch the voltages provided to each sense amplifier of the at least one sense amplifier during each operation.

2. The semiconductor memory device as claimed in claim 1, wherein the control unit comprises at least one of:
   a first control unit providing the voltage that is controlled based on the characteristics of the pair of first transistors of each sense amplifier of the at least one sense amplifier to the pair of first transistors of each sense amplifier of the at least one sense amplifier; and
   a second control unit providing a reverse bias voltage that is controlled based on the characteristics of the pair of first transistors of each sense amplifier of the at least one sense amplifier to the pair of first transistors of each sense amplifier of the at least one sense amplifier.

3. The semiconductor memory device as claimed in claim 2, wherein the first control unit comprises a first voltage generation unit generating a first adjustment voltage, and the first adjustment voltage is a voltage that is used to adjust the voltage provided to the pair of first transistors of each sense amplifier in the at least one sense amplifier.

4. The semiconductor memory device as claimed in claim 3, wherein the first voltage generation unit comprises:
   a first driver used to adjust the voltage provided to the pair of first transistors of each sense amplifier of the at least one sense amplifier during the offset elimination operation by using the first adjustment voltage;
   a first constant current source;
   a first transistor set comprising a plurality of transistors connected between the first driver and the first constant current source, wherein each transistor of the plurality of transistors has characteristics that are the same as the characteristics of the first transistors of each sense amplifier of the at least one sense amplifier; and
   a first operational amplifier having a first input terminal connected to a node between the first transistor set and the first constant current source and a second input terminal to which the target voltage is input, wherein the first operational amplifier generates the first adjustment voltage based on voltages input to the first input terminal and the second input terminal and outputs the first adjustment voltage.

5. The semiconductor memory device as claimed in claim 2, wherein the second control unit comprises:
   a second driver adjusting a first adjustment voltage of the pair of first transistors of each sense amplifier of the at least one sense amplifier to provide the voltage to the pair of first transistors of each sense amplifier of the at least one sense amplifier during the offset elimination operation;
   a second constant current source;
   a second transistor set comprising a plurality of transistors connected between the second driver and the second constant current source, wherein each transistor of the plurality of transistors has characteristics that are the same as the characteristics of the first transistors of each sense amplifier of the at least one sense amplifier; and
   a second operational amplifier having a first input terminal connected to a node between the second transistor set and the second constant current source and a second input terminal to which the target voltage is input, wherein the second operational amplifier generates the reverse bias voltage, which is provided to the pair of first transistors of each sense amplifier of the at least one sense amplifier and to the plurality of transistors of the second transistor set, based on voltages input to the first input terminal and the second input terminal and outputs the reverse bias voltage.

6. The semiconductor memory device as claimed in claim 1, wherein the control unit further comprises:
   a third control unit providing the voltage that is adjusted based on the characteristics of the pair of second transistors of each sense amplifier of the at least one sense amplifier to the pair of second transistors of each sense amplifier of the at least one sense amplifier; and
   a fourth control unit providing a reverse bias voltage that is adjusted based on the characteristics of the pair of second transistors of each sense amplifier of the at least one sense amplifier to the pair of second transistors of each sense amplifier of the at least one sense amplifier.

7. The semiconductor memory device as claimed in claim 6, wherein the third control unit comprises a second voltage generation unit generating a second adjustment voltage, and the second adjustment voltage is a voltage that is used to adjust the voltage of the pair of second transistors of each sense amplifier of the at least one sense amplifier.

8. The semiconductor memory device as claimed in claim 7, wherein the second voltage generation unit comprises:
a third driver adjusting the second adjustment voltage and providing the second adjustment voltage to the pair of second transistors of each sense amplifier of the at least one sense amplifier during the offset elimination operation;
a third constant current source;
a third transistor set comprises a plurality of transistors connected between the third driver and the third constant current source, wherein each transistor of the plurality of transistors has characteristics that are the same as the characteristics of the second transistors of each sense amplifier of the at least one sense amplifier; and
a third operational amplifier having a first input terminal connected to a node between the third transistor set and the third constant current source and a second input terminal to which the target voltage is input, wherein the third operational amplifier generates the second adjustment voltage based on voltages input to the first input terminal and the second input terminal and outputs the second adjustment voltage.

9. The semiconductor memory device as claimed in claim 6, wherein the fourth control unit comprises:
a fourth driver adjusting the voltage of the pair of second transistors of each sense amplifier of the at least one sense amplifier to provide the voltage of the pair of second transistors of each sense amplifier of the at least one sense amplifier during the offset elimination operation;
a fourth constant current source;
a fourth transistor set comprising a plurality of transistors connected between the fourth driver and the fourth constant current source, wherein each transistor of the plurality of transistors has characteristics that are the same as the characteristics of the second transistors of each sense amplifier of the at least one sense amplifier; and
a fourth operational amplifier having a first input terminal connected to a node between the fourth transistor set and the fourth constant current source and a second input terminal to which the target voltage is input, wherein the fourth operational amplifier generates the reverse bias voltage, which is provided to the pair of second transistors of each sense amplifier of the at least one sense amplifier and to the plurality of transistors of the fourth transistor set, based on voltages input to the first input terminal and the second input terminal and outputs the reverse bias voltage.

10. The semiconductor memory device as claimed in claim 1, wherein one pair of the pair of first transistors and the pair of second transistors is implemented by N-channel field effect transistors, and the other pair of the pair of first transistors and the pair of second transistors is implemented by P-channel field effect transistors.

11. A semiconductor memory device comprising:
at least one sense amplifier, wherein each sense amplifier of the at least one sense amplifier comprises a pair of first transistors and a pair of second transistors; and
a control unit providing a voltage that is adjusted based on characteristics of the pair of first transistors and the pair of second transistors of each sense amplifier of the at least one sense amplifier to the pair of first transistors and the pair of the second transistors of each sense amplifier of the at least one sense amplifier, and providing a voltage that is adjusted based on characteristics of the pair of second transistors of each sense amplifier of the at least one sense amplifier to the pair of second transistors of each sense amplifier of the at least one sense amplifier, so that voltages of a pair of bit lines connected to each sense amplifier of the at least one sense amplifier are close to a specific target voltage during an offset elimination operation,
wherein when a magnitude of the voltage provided to the pair of first transistors of each sense amplifier of the at least one sense amplifier during the offset elimination operation is the same as a magnitude of the voltage provided to the pair of first transistors of each sense amplifier of the at least one sense amplifier during a voltage amplification operation of a pair of bit lines, the control unit is configured to not switch the voltages provided to each sense amplifier of the at least one sense amplifier during each operation.

12. A control method for a semiconductor memory device, wherein the semiconductor memory device comprises at least one sense amplifier, and each sense amplifier of the at least one sense amplifier comprises a pair of first transistors and a pair of second transistors, and a control unit of the semiconductor memory device performs at least one step:
providing a voltage that is adjusted based on characteristics of the pair of first transistors of each sense amplifier of the at least one sense amplifier to the pair of first transistors of each sense amplifier of the at least one sense amplifier, and providing a voltage that is adjusted based on characteristics of the pair of second transistors of each sense amplifier of the at least one sense amplifier to the pair of second transistors of each sense amplifier of the at least one sense amplifier, so that voltages of a pair of bit lines connected to each sense amplifier of the at least one sense amplifier are close to a specific target voltage during an offset elimination operation,
switching the voltages provided to each sense amplifier of the at least one sense amplifier during each operation when a magnitude of the voltage provided to the pair of first transistors of each sense amplifier of the at least one sense amplifier during the offset elimination operation is different from a magnitude of the voltage provided to the pair of first transistors of each sense amplifier of the at least one sense amplifier during a voltage amplification operation of a pair of bit lines.

13. The control method for a semiconductor memory device as claimed in claim 12, wherein the control unit further performs steps:
providing the voltage that is controlled based on the characteristics of the pair of first transistors of each sense amplifier of the at least one sense amplifier to the pair of first transistors of each sense amplifier of the at least one sense amplifier; and
providing a reverse bias voltage that is controlled based on the characteristics of the pair of first transistors of each sense amplifier of the at least one sense amplifier to the pair of first transistors of each sense amplifier of the at least one sense amplifier.

14. The control method for a semiconductor memory device as claimed in claim 13, wherein the control unit further performs a step:
generating a first adjustment voltage, wherein the first adjustment voltage is a voltage that is used to adjust the voltage provided to the pair of first transistors of each sense amplifier in the at least one sense amplifier.

15. The control method for a semiconductor memory device as claimed in claim 12, wherein the control unit further performs steps:
provided the voltage that is adjusted based on the characteristics of the pair of second transistors of each sense amplifier of the at least one sense amplifier to the pair of second transistors of each sense amplifier of the at least one sense amplifier; and
providing a reverse bias voltage that is adjusted based on the characteristics of the pair of second transistors of each sense amplifier of the at least one sense amplifier to the pair of second transistors of each sense amplifier of the at least one sense amplifier.

16. The control method for a semiconductor memory device as claimed in claim 15, wherein the control unit further performs a step:
generating a second adjustment voltage, and the second adjustment voltage is a voltage that is used to adjust the voltage of the pair of second transistors of each sense amplifier of the at least one sense amplifier.

17. The control method for a semiconductor memory device as claimed in claim 12, wherein the control unit further performs a step:
not switching the voltages provided to each sense amplifier of the at least one sense amplifier during each operation when the magnitude of the voltage provided to the pair of first transistors of each sense amplifier of the at least one sense amplifier during the offset elimination operation is the same as the magnitude of the voltage provided to the pair of first transistors of each sense amplifier of the at least one sense amplifier during the voltage amplification operation of a pair of bit lines.

18. The control method for a semiconductor memory device as claimed in claim 12, wherein one pair of the pair of first transistors and the pair of second transistors is implemented by N-channel field effect transistors, and the other pair of the pair of first transistors and the pair of second transistors is implemented by P-channel field effect transistors.

* * * * *